Sept. 8, 1970  F. M. ADLER  3,527,553
APPARATUS FOR THE CONSTRUCTION OF ELEVATED WAYS
Filed Feb. 4, 1969  5 Sheets-Sheet 3
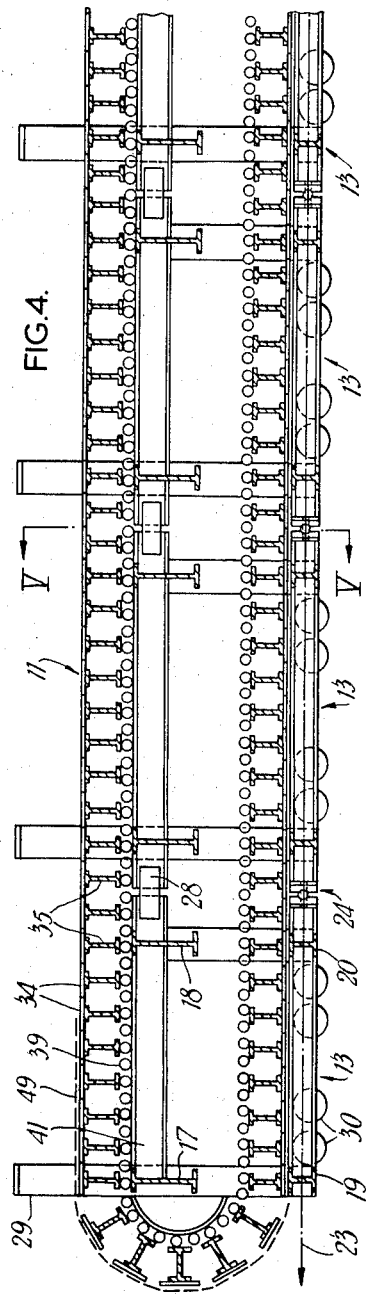
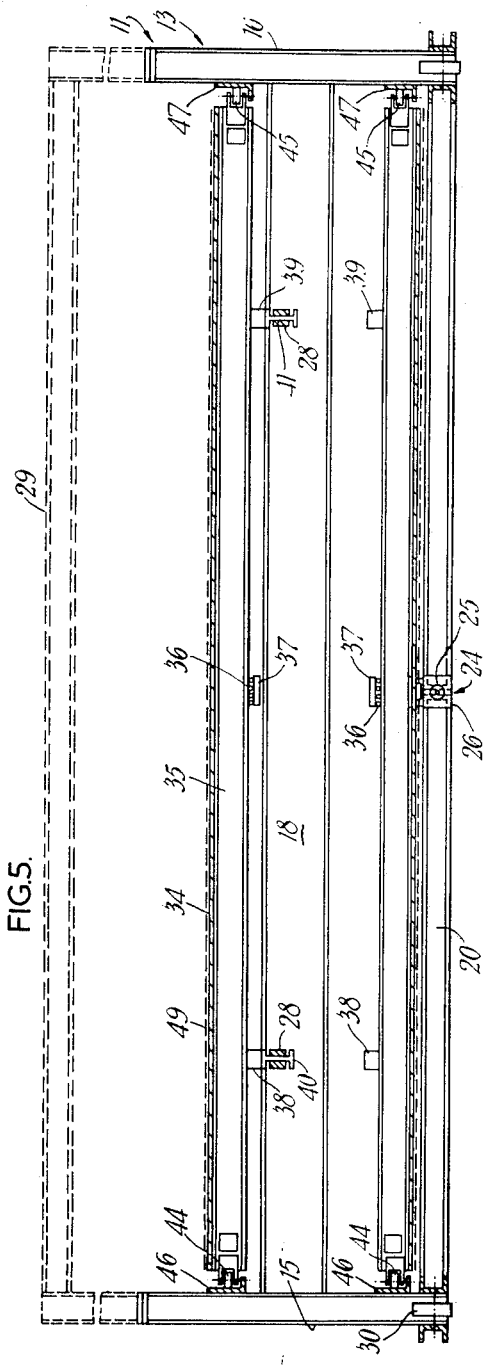

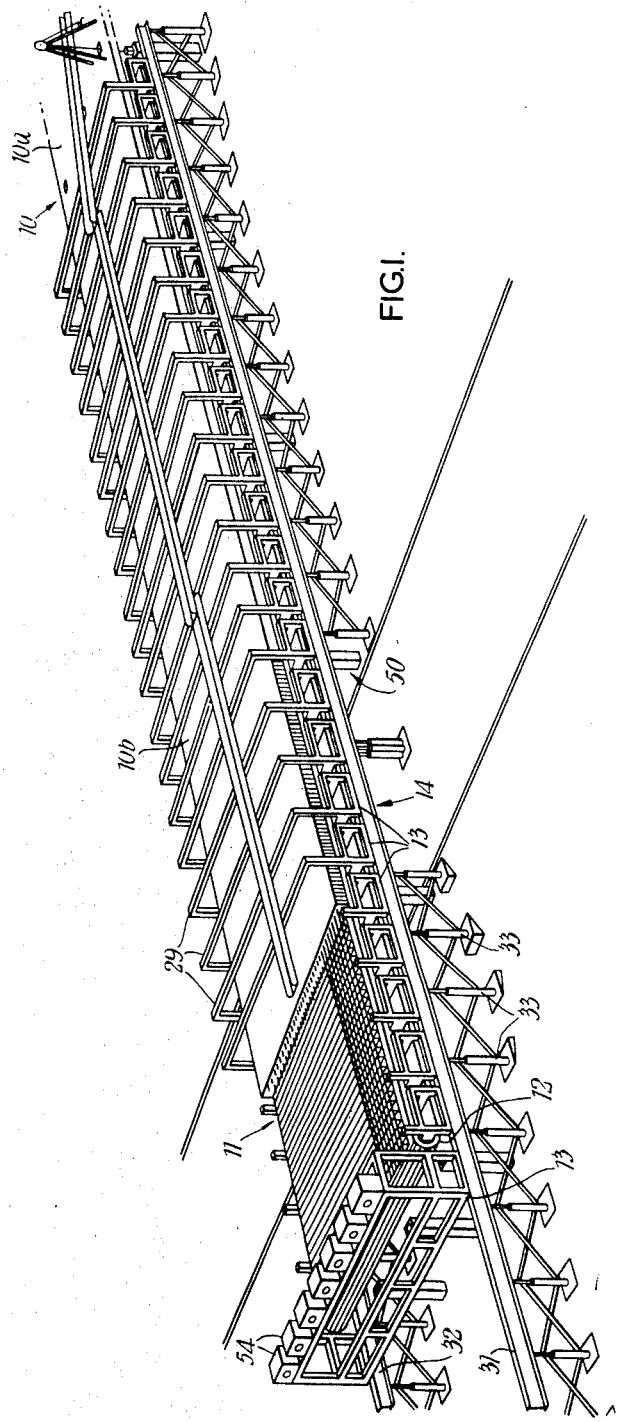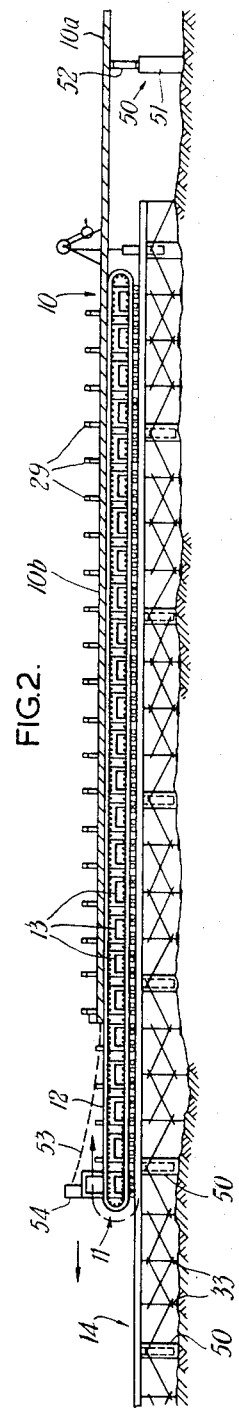

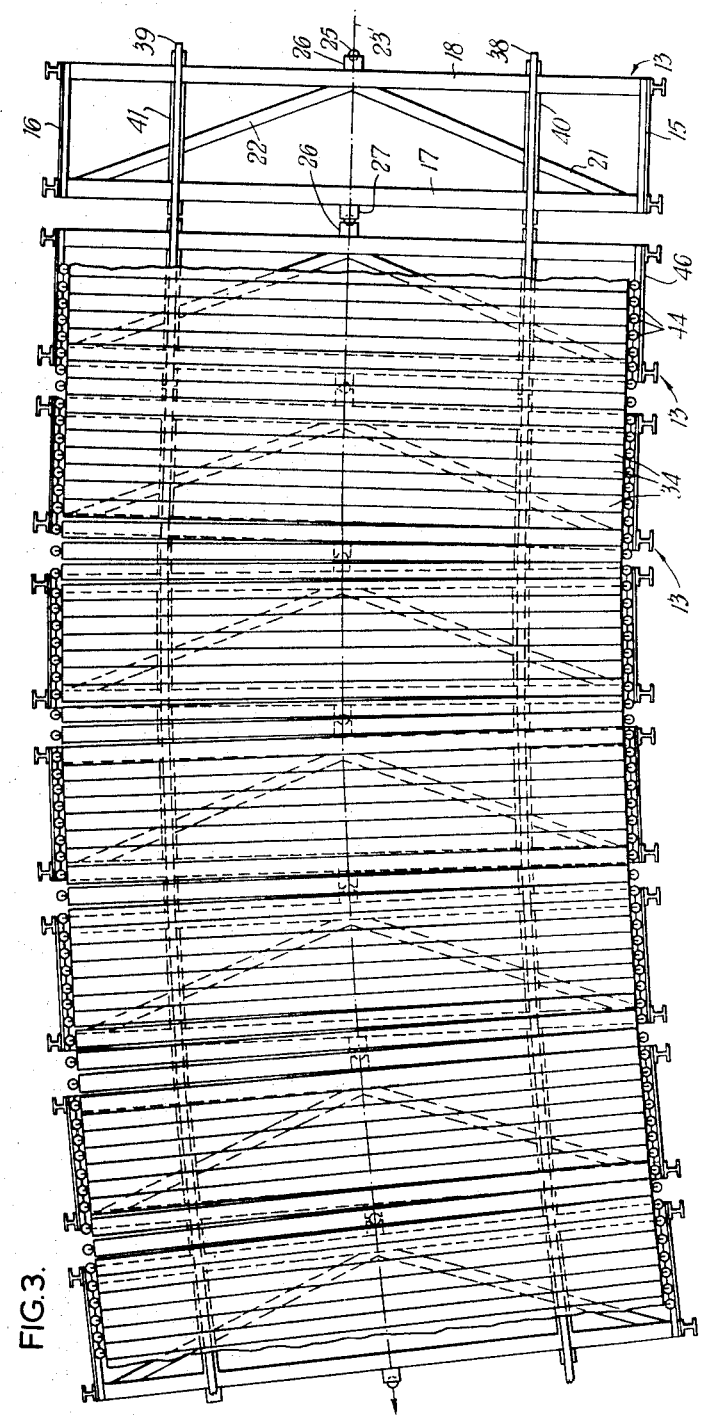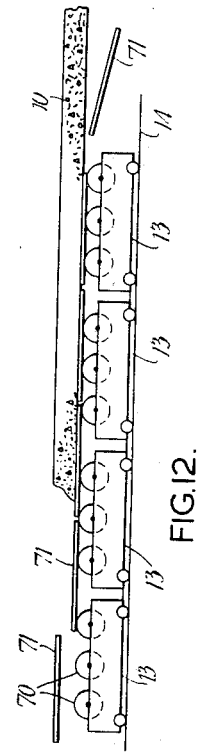

Sept. 8, 1970   F. M. ADLER   3,527,553
APPARATUS FOR THE CONSTRUCTION OF ELEVATED WAYS
Filed Feb. 4, 1969   5 Sheets-Sheet 4

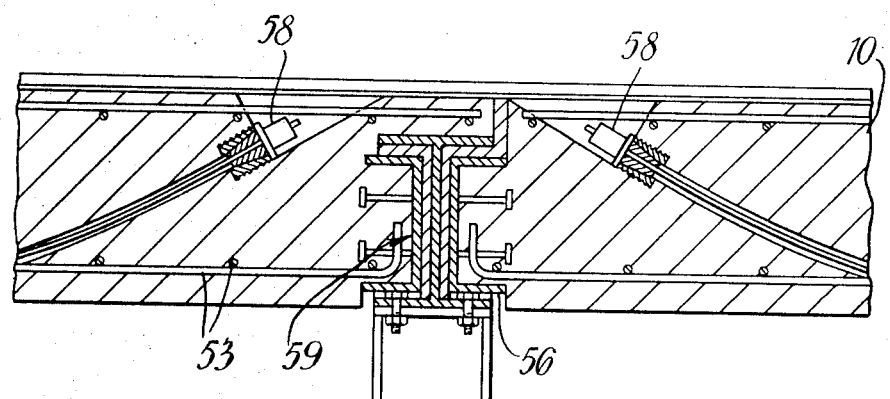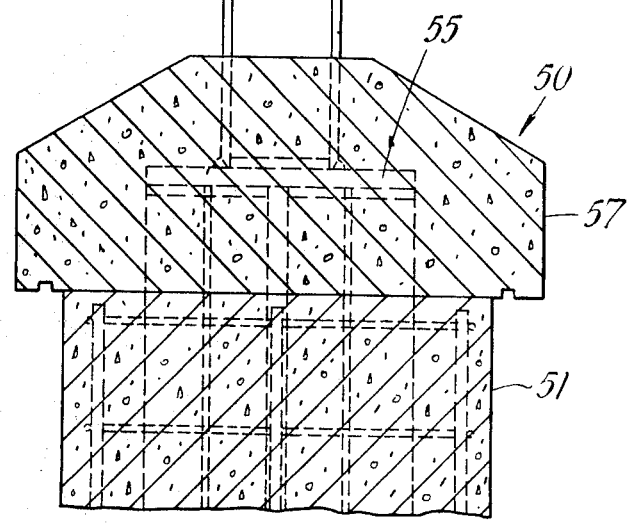
FIG. 8.

United States Patent Office 3,527,553
Patented Sept. 8, 1970

3,527,553
APPARATUS FOR THE CONSTRUCTION OF ELEVATED WAYS
Felix M. Adler, Woodlands, Birds Hill Road,
Oxshott, Surrey, England
Filed Feb. 4, 1969, Ser. No. 796,465
Claims priority, application Great Britain, Feb. 6, 1968,
5,920/68
Int. Cl. E01c *21/00*
U.S. Cl. 94—22      9 Claims

ABSTRACT OF THE DISCLOSURE

The invention is concerned with a method of forming an elevated structure, for instance a motor way, continuously, and the apparatus for carrying out this method. The apparatus comprises a material supporting member mounted on and supported by a movable member which is movable beneath and relative to the material support member and in that the material supporting member has an upper surface which is stationary relative to the material which it supports and which is continuously and endlessly extensible in the direction of movement of the movable member and continuously removable from the hardened material at the trailing end of the apparatus. The point at which the hardenable material is laid on the support member is stationary relative to the movable member and moves forwardly relative to the support member. This facilitates the continuous laying of the hardenable material in a fluid state although the process can be carried out step-wise.

BACKGROUND TO THE INVENTION

The present invention relates to apparatus for the construction of overhead structure, for instance elevated motorways, which enables the elevated way to be constructed continuously.

One known method of constructing an elevated motorway is to provide a fixed ground based support structure for the shuttering for the concrete way and lay the concrete in the shuttering. In this manner the concrete way is built stepwise and the fixed ground based support structure has to be set up along the full length of the elevated motorway.

Another known method employs a travelling carriage carrying a formwork stage which remains in place until the concrete has matured. The formwork stage is then lowered to disengage from the soffit, the carriage is moved forwardly the formwork stage raised into position again and fresh concrete laid on the stage in its new position.

It is also known to provide movable shuttering for a vertical slab of concrete. In this known method of constructing a vertical concrete slab, which is known as "slip-forming," the shuttering which supports the vertical faces of the slap is "slipped" upwardly over the vertical faces of the slab as the concrete hardens. However, this method cannot be used for a horizontal elevated structure because the concrete has to be left for a longer period before it becomes self supporting, than is the case in a vertical structure, and by this time the shuttering will adhere to concrete and will be immovable.

The present invention has for its object the provision of a single movable support structure which will support the green concrete of an elevated way, while being continuously movable in the direction of construction, thereby achieving continuously construction and great erection speed.

STATEMENT OF THE INVENTION

According to the present invention, there is provided continuously movable apparatus for continuously supporting a structural surface which is continuously formed from a hardenable material during the hardening process and until such material is self supporting, wherein the apparatus comprises a material supporting member mounted on and supported by a movable member which is movable beneath and relative to the material support member and in that the material supporting member has an upper surface which is stationary relative to the material which it supports and which is continuously and endlessly extensible in the direction of movement of the movable member and continuously removable from the hardened material at the trailing end of the apparatus.

According to a further aspect of the invention there is also provided a method of forming a self supporting structure from a hardenable material comprising the steps of laying the hardenable material in a fluid state progressively along a surface of a support member therefor, providing a movable member beneath the support member which movable member supports the support member while being movable relative thereto, progressively extending the support member forwardly and simultaneously withdrawing the support member rearwardly from beneath the hardenable material as it becomes self-supporting, moving the movable member bodily forwardly to support the progressively extending support surface and inserting permanent supports beneath the hardened material.

DESCRIPTION OF THE DRAWINGS

FIG. 1 is a diagrammatic perspective view of an elevated way in the course of construction with the apparatus of the present invention, FIG. 2 is a diagrammatic elevation of an elevated way in the course of construction with the apparatus of the present invention, FIG. 3 is a plan view of the endless support forming a part of the apparatus of the present invention, FIG. 4 is a longitudinal section through the endless support of FIG. 3, FIG. 5 is a section on the line V—V of FIG. 4, FIG. 8 is a vertical section, on an enlarged scale, through one of the permanent vertical supporting pillars for the way shown in FIGS. 1 and 2, FIGS. 9 to 11 are cross sections through alternative constructions of concrete ways, and FIG. 12 is a diagrammatic illustration of a further embodiment of the invention.

DESCRIPTION OF A PREFERRED EMBODIMENT

Figure 6:
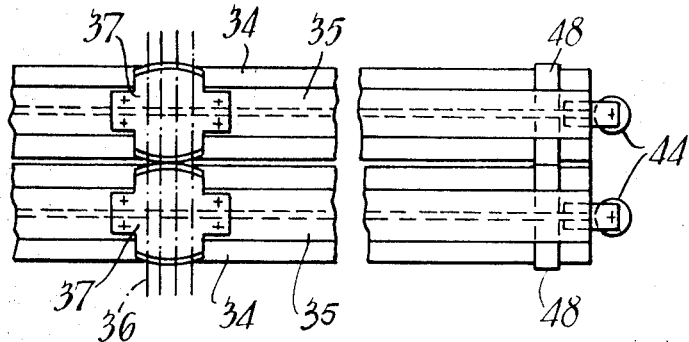
FIG. 6 is an underplan, on an enlarged scale, of a detail of FIG. 3.
Figure 7:
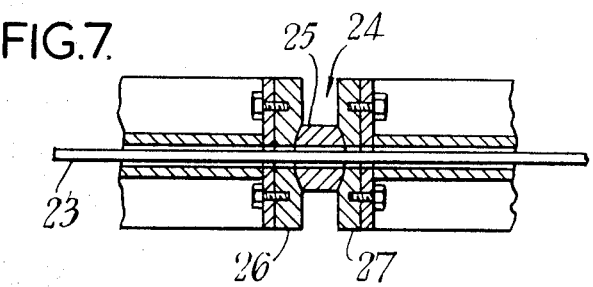
FIG. 7 is a section, on an enlarged scale, of a detail of the endless support shown in FIGS. 3, 4 and 5.

In FIGS. 1 and 2, which are intended only as diagrammatic illustrations, a way 10 formed from concrete is shown in the course of construction.

The way 10 comprises a hardened section 10*a* supported by permanent vertical pillars 50, and a green concrete section 10*b* which is in the process of hardening and which is supported by a movable conveyor 11. The conveyor 11 comprises an endless support 12, which is mounted on a series of similar trucks 13, the trucks 13 being linked to form a continuous train movable along a fixed ground based track 14.

In operation, green concrete is laid continuously from a conveyor 80 on to the leading end of the endless support 12 as the trucks 13 are moved along the track 14. As the trucks move forward the endless support 12 is extended forwardly continuously and withdrawn continuously from the hardened section 10*a* of the concrete way. The rate of movement of the trucks is related to the length of endless support so as to ensure that the green concrete is supported for sufficient time, say four days, for it to be self supporting before the endless support 12 is withdrawn and it will be seen that there is no relative movement between that part of the endless support 12 which is in contact with and supporting the soffit of the way. Preferably, a vibrator is employed to level the upper surface of the concrete and the vibrator will be supported on the trucks so as to move with the trucks.

The operation can also be carried out in a stepwise manner to suit the building conditions for instance if only a short length of elevated way is under construction.

The conveyor 11, comprising the endless support 12 and trucks 13, is shown in detail in FIGS. 3 to 7.

Each truck 13, which is formed from H-section beams, comprises rectangular side frames 15 and 16, upper cross-beams 17 and 18, lower cross-beams 19, 20 and inclined lower braces 21 and 22. Adjacent trucks are connected by a steel wire 23 passing through linkages 24, one of which is shown in detail in FIG. 7. The linkage 24 is positioned at the mid-point between the lower braces of adjacent trucks and the inclined lower beams 21 and 22 ensure that the thrust exerted through the linkage is evenly transferred to the wheel frames. The steel wire 23 extends continuously through the train of trucks and each linkage 24, through which the wire passes, comprises a spherical bearing member 25 mounted in complementary bearings 26 and 27 on the adjacent trucks. Since the trucks are linked at their centre points they will function in the manner of a train and will follow a curve in the track 14, as shown in FIG. 3. The adjacent trucks are also linked by telescopically adjustable members 28, which are extensible to allow for articulated movement. The members 28 also serve to keep the trucks in alignment. The trucks which, as shown in FIGS. 1 and 2, are positioned behind the concrete laying area, are additionally provided with an overhead cross-beam 29 for supporting a working platform.

Preferably, the driving thrust on the trucks 13 is provided from the rear, but by means of a winch positioned forwardly of the conveyor 11.

Each truck 13 is mounted on wheels 30 which run on parallel rails 31 and 32 of the track 14. The rails 31 and 32 are supported by temporary ground based pillars 33 which are vertically adjustable to compensate for the unevenness of the ground and cross-braced as shown.

The endless support 12 which is mounted on the trucks 13 comprises a plurality of plates 34, each of which is mounted on an I-section joist 35. The plates 34 and joists 35 are arranged transversely of the direction of movement of the conveyor 11 and are linked by wires 36, which are clamped against the undersurfaces of the joist 35 by bolts (not shown) and plates 37 which are dimensioned to act as separators forming a small gap between adjacent plates 34 and shaped to allow angular movement between adjacent joists. The joists 35 run on two roller races 38 and 39 respectively, each of which is linked and guided in chain form to reduce friction to a minimum. The roller races 38 and 39, themselves run on I-section guideways 40 and 41 respectively, which form an integral part of each truck. As can be seen from FIG. 4 the telescopic linking members 28 are mounted on the guideways 40 and 41.

Rollers 44 and 45 are journalled at each end of each joist 35 for rotation about a vertical axis and these rollers ride on vertical plates 46 and 47 respectively which are fixed to the side frames of each truck. The rollers 44, 45 ensure horizontal alignment of the joists 35. In order to provide a camber or curve on the way 10 the height and direction of the track 14 is adjusted.

The joists 35, which are linked by the wires 36 at their mid-points, are spaced apart slightly by the plates 37, as shown in FIG. 6, and are angularly self-adjusting, within limits set by the plates 37, to allow for curvature of the track 14. The ends of adjacent beams are separated by resilient buffers 48 to permit curving of the conveyor 11 and to ensure alignment of the joists during linear movement.

In order to prevent green concrete from falling between adjacent plates 34, the plates are covered by an endless belt 49, which can, for example, be a rubber belt. Alternatively, the plates can be covered by a series of sheets inserted at the leading end and removed from the trailing end.

The construction of the elevated way 10 and the operation of the conveyor 11 will now be described in greater detail with reference to FIGS. 1 and 2.

The permanent vertical pillars 50 are first erected along the route of the elevated way. Each pillar 50, one of which is shown in detail in FIG. 8, comprises a hollow lower section 51 formed by two I-beams cast in concrete and an upper section 52 in the form of an I-beam, which is initially housed within the hollow lower section 51 and which is drawn out of the lower section after the conveyor has passed the pillar and mounted on the lower section in a manner described in detail below.

The track 14 is then laid beneath the line of the proposed way 10 and the conveyor 11, comprising the train of trucks 13 and the endless support 12, is mounted upon the track. Concrete is laid on the upper horizontal surface of the endless support 12 from the conveyor 80, suitable shuttering being provided at the sides, and prestressing cable 53 can be fed into the green concrete from reels 54, which are positioned forwardly of the conveyor 11, if this is required. Prefabricated reinforcement cages are also laid on the conveyor to be concreted in subsequently.

The length of the endless support 12 and the rate of forward movement of the train of trucks are such that the concrete will harden sufficiently to be self-supporting by the time the endless support 12 is removed from the soffit. The trucks 13 are winched continuously forwardly causing the endless support 12, comprising the cover belt 49, plates 34 and joists 35, to move continuously backwardly relative to the movement of the trucks 13 on the roller races 38, 39 while remaining stationary relative to the soffit of the way 10. The support surface for the concrete at the rear of the conveyor is progressively withdrawn, the support surface at the front of the conveyor is projected forwardly and the laying of green concrete can proceed continuously forwardly above the track 14.

As the conveyor 11 moves forwardly on the track 14, leaving the hardened concrete way 10a unsupported, the permanent pillars 50 are erected in their place to provide permanent support. This is done quickly and easily by winching the upper section 52 out of the lower section 51 and pinning it to the soffit of the way 10, so that it is suspended from the way 10, pinning a metal plate 55 across the top of the hollow lower section and pinning the upper section 52 on the plate 55. The upper section is preferably pinned to a reinforcing beam 56 inset across the way 10 and a cap 57 is preferably added to the lower section 51 to complete the support column 50.

As can be seen from FIG. 8, the hardened and self-supporting way 10 includes steel reinforcement 53, means 58 for prestressing cables in the way and expansion joints 59 between the sections. Each expansion joint comprises the I-section beam 56 and a resilient filler 81 between the beam 56 and flanges 82, 83 on the way 10. Bearings of known design are located at intervals across the way 10, between the lower surface of each flange 82, 83 and the supporting faces of the beam 56 to allow for movement between the two sections of the way 10.

It will be apparent from the foregoing description that the conveyor 11 provides a continuously movable supporting surface for green concrete which enables an elevated concrete way to be built continuously by a method of construction which is economic both of capital equipment and labor. Furthermore, the conveyor 11 can follow a curved route, it can provide a camber on the elevated way and it will compensate for irregularities in the terrain. Of particular importance is the fact that the point at which concrete is laid on the supporting surface 12 remains stationary relative to the train of trucks 13 although it moves forwardly relative to the supporting surface. This enables the concrete to be laid continuously if required without any interruption of the construction process.

It will be appreciated from the foregoing description that, while the conveyor 11 lends itself well to the construction of an elevated concrete way, it can equally well be used as a continuously movable staging for use in supporting steel beams temporarily during the construction of a steel structure or a steel-concrete composite structure.

It will also be clear from the foregoing that many minor modifications can be made to the conveyor 11 without departing from the scope of the present invention. For instance, the friction reducing roller races 38, 39 can be replaced by any mechanical equivalent. Similarly, the structure of the endless support 12 can be modified provided that it retains sufficient structural rigidity to support the green concrete and sufficient flexibility to recirculate.

Figure 9:
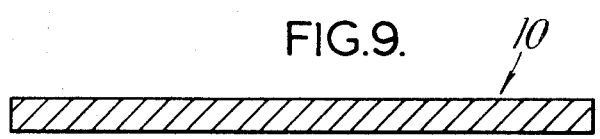
Figure 10:
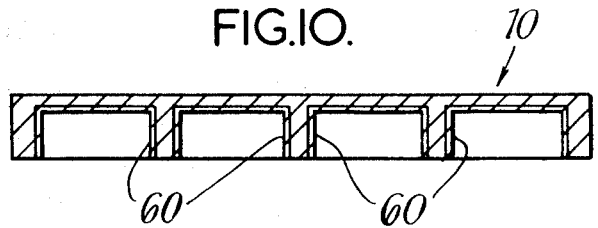

It will also be understood that the endless support 12 of the conveyor 11 can be modified to provide a concrete way with a variety of cross-sectional shapes other than that shown in FIG. 9. For instance, a plurality of hollow inserts 60 can be laid on the support 12 before the green concrete is laid so that the inserts are embedded in the soffit to give the coffered slab cross-section shown in FIG. 10. Alternatively, a plurality of H-section girders 61 can be laid on the support 12 and permanent or removable formers 62 provided between the girders 61 to give the way construction shown in FIG. 11.

It is also envisaged that the endless support 12 which recirculates can be replaced by a series of rollers which do not recirculate and are journalled for rotation about their axes on the trucks 13. This embodiment of the invention is illustrated diagrammatically in FIG. 12, in which fixed rollers 70 support a series of plates or boards 71 on which the green concrete is laid. As the tracks 13 are driven forwardly new plates are placed on the leading rollers and used plates removed from the soffit of the hardened way 10 and either re-used or destroyed.

The embodiment of the invention shown in FIG. 12 can be used for supporting the soffit of an elevated structure and is also particularly suitable for supporting a vertical or inclined face. For instance, two of the conveyors shown in FIG. 12 can be used, one on either side of a vertical wall to support the opposite vertical faces of the walls. When used in this manner, the rollers 70 are journalled about vertical axes and located to one side of the trucks 13.

It will be understood that further modifications can be made to the above described apparatus without departing from the scope of the invention, the foregoing being a description of the preferred embodiments of the invention which is not to be taken as in any sense limiting, the proper scope of the invention being best described in the following claims.

What I claim is:

1. Continuously movable apparatus for continuously supporting a structural surface which is continuously formed from a hardenable material during the hardening process and until such material is self-supporting, wherein the apparatus comprises a material supporting member mounted on and supported by a movable member which is movable beneath and relative to the material support member and in that the material supporting member has an upper surface which is stationary relative to the material which it supports and which is continuously and endlessly extensible in the direction of movement of the movable member and continuously removable from the hardened material at the trailing end of the apparatus.

2. Apparatus as claimed in claim 1, wherein the material supporting member comprises an endless conveyor which is mounted upon a plurality of articulated trucks.

3. Apparatus as claimed in claim 2, wherein the endless conveyor comprises a plurality of strip elements arranged transversely to the direction of travel of the conveyor and in which the strip elements ride on friction reducing means which are interposed between the strip elements and the trucks and which circulate with the strip elements.

4. Apparatus as claimed in claim 3, wherein the trucks are mounted on wheels running on a fixed track.

5. Apparatus as claimed in claim 4, wherein the trucks and the strip elements are linked together so as to allow angular movement between adjacent trucks and adjacent strip elements to enable the endless conveyor to follow a curvilinear course.

6. Apparatus as claimed in claim 1, in which means for laying the concrete in a fluid state are provided above the supporting member, the said means being stationary relative to the movable member and movable therewith relative to the supporting member.

7. Apparatus as claimed in claim 1, wherein the material supporting member comprises a plurality of flat panels supported upon a plurality of rollers journalled for rotation about their own axes on the movable member.

8. A method of forming a self-supporting structure from a hardenable material comprising the steps of laying the hardenable material in a fluid state progressively along a surface of a support member therefor, providing a movable member beneath the support member which movable member supports the support member while being movable relative thereto, progressively etxending the support member forwardly and simultaneously withdrawing the support member rearwardly from beneath the hardenable material as it becomes self supporting, moving the movable member bodily forwardly to support the progressively extending support surface and inserting permanent supports beneath the hardened material.

9. A method as claimed in claim 8, in which the movable member is moved forwardly continuously and the support member is extended forwardly and withdrawn rearwardly, whereby the hardenable material is laid continuously in a fluid state at a point which moves continuously forwardly relative to the support member with the movable member.

References Cited
UNITED STATES PATENTS

| | | | |
|---|---|---|---|
| 2,187,879 | 1/1940 | Johnson | 94—39 X |
| 3,067,469 | 12/1962 | Yarrison | 18—55 |
| 3,086,431 | 4/1963 | Perry | 94—1.5 X |
| 3,230,843 | 1/1966 | Santucci | 94—46 X |
| 3,275,719 | 9/1966 | Dudson | 264—34 |
| 3,299,191 | 1/1967 | Mantscheff | 264—34 |

NILE C. BYERS, Jr., Primary Examiner

U.S. Cl. X.R.
94—39; 264—34